United States Patent [19]

Forster

[11] Patent Number: 5,391,122
[45] Date of Patent: Feb. 21, 1995

[54] HYDROMECHANICAL DRIVE SYSTEM

[75] Inventor: Franz Forster, Karlstadt-Muhlbach, Germany

[73] Assignee: Linde Aktiengesellschaft, Germany

[21] Appl. No.: 23,614

[22] Filed: Feb. 26, 1993

[30] Foreign Application Priority Data

Feb. 27, 1992 [DE] Germany .......................... 4206101.6

[51] Int. Cl.6 .............................................. F16H 47/04
[52] U.S. Cl. ........................................ 475/72; 475/78; 475/331
[58] Field of Search ...................... 475/72, 78, 83, 331, 475/346

[56] References Cited

U.S. PATENT DOCUMENTS

| | | | |
|---|---|---|---|
| 3,180,080 | 4/1965 | Budzich et al. | 475/72 |
| 4,037,694 | 7/1977 | Keese | 192/4 |
| 4,046,029 | 9/1977 | Sugden | 475/72 |
| 4,583,425 | 4/1986 | Mann et al. | 74/730 |
| 4,952,200 | 8/1990 | Ohkawa | 475/72 |
| 5,002,521 | 3/1991 | Schwarz et al. | 475/72 |
| 5,090,949 | 2/1992 | Thoma et al. | 475/83 |

FOREIGN PATENT DOCUMENTS

| | | | |
|---|---|---|---|
| 1904831 | 9/1969 | Germany . | |
| 1804779 | 7/1973 | Germany . | |
| 2311115 | 9/1974 | Germany | 475/83 |
| 1335666 | 10/1973 | United Kingdom . | |

Primary Examiner—John T. Kwon
Attorney, Agent, or Firm—Webb Ziesenheim Bruening Logsdon Orkin & Hanson

[57] ABSTRACT

A hydromechanical drive system having a swash-plate type hydrostatic axial piston engine and a mechanical transmission including a connection plate having a control surface. The axial piston engine includes an outer housing and a cylindrical drum with working cylinders located within the outer housing. Hydraulic-medium channels are formed in the connection plate which open onto the control surface and the working cylinders are periodically connected with the hydraulic-medium channels during rotation of the cylindrical drum. A gear element is located on the connection plate.

16 Claims, 5 Drawing Sheets

HYDROMECHANICAL DRIVE SYSTEM

BACKGROUND OF THE INVENTION

1. Field of the Invention

The invention relates generally to a hydromechanical drive system consisting of a swash-plate type hydrostatic axial piston engine and a mechanical transmission such as a geared transmission. The axial piston engine has a cylindrical drum provided with working cylinders and a control surface onto which hydraulic-medium channels open so that the working cylinders are periodically connected with the hydraulic-medium channels during rotation of the cylindrical drum.

2. Description of Related Prior art

A hydromechanical drive system for driving a crawler track or for use as the gear drive for a work vehicle is disclosed in U.S. Pat. No. 4,583,425 which is incorporated herein by reference. In this prior art drive system, the axial piston engine is partially integrated into the transmission. The cylindrical drum and the swash plate of the axial piston engine and the surrounding housing are located in a hollow space of the planet carrier of the last stage of the planetary transmission. This arrangement reduces the axial structural length of the drive system as compared to other hydromechanical drive systems. However, the radial dimensions of this system are greater than the radial dimensions of a single axial piston engine which is disadvantageous. Furthermore, in connection with the axial length of the drive system, the control base receptacle is provided with hydraulic-medium channels for the delivery and return of a hydraulic medium.

SUMMARY OF THE INVENTION

The present invention provides a hydromechanical drive system with relatively small dimensions. This object is achieved by providing a component having a gear element which is either attached thereto or integral therewith. Hydraulic-medium channels are located in the component to open onto a control surface. In contrast to prior art drive systems, the invention provides an arrangement wherein the transmission is not located axially adjacent to the swash plate of the axial piston engine, but rather is located adjacent to the control surface through which the hydraulic medium flows.

The hydromechanical drive system of the invention is not restricted to an arrangement wherein the axial piston engine is located on the input side, i.e., serves as a motor, and the mechanical transmission is located on the output side. It is also possible to use the axial piston engine as a pump with a mechanical transmission connected upstream therefrom. In the latter arrangement, the mechanical transmission forms the input part of the hydromechanical drive system.

The gear element can be, for example, a gear of a spur transmission or a friction wheel of a friction transmission. To obtain minimal dimensions, it is advantageous if the transmission consists of a planetary transmission of at least one stage and the gear element is designed as a ring gear of the planetary transmission, whereby the cylindrical drum is non-rotatably connected to the sun gear and the carrier of the planetary transmission is connected to a rotatable output element. It is possible to provide other components of the planetary transmission, such as the sun gear or the carrier as the gear element. A cyclic transmission can be provided instead of a planetary transmission.

Particularly advantageous is an arrangement wherein the ring gear is located axially between the control surface and the face of the cylindrical drum facing the control surface and has holes therein for connection of the hydraulic-medium channels on the control surface side with the working cylinder on the cylindrical drum side. Such an arrangement has only a slightly larger axial dimension than a single axial piston engine. If the external diameter of the ring gear is not greater than the external diameter of the cylindrical drum or is only slightly greater, the radial dimensions of the drive system according to the invention do not exceed the radial dimensions of a single axial piston engine.

In an improvement of the invention, the transmission can be shifted, and it is advantageous if the ring gear is rotatable about a central axis which is coaxial with the rotational axis of the cylindrical drum and can be connected by shiftable couplings with the cylindrical drum and/or with a stationary part of the housing. It is advantageous for the couplings to be shiftable under load.

According to the invention, a first shiftable coupling has at least one annular plate located around the outside of the cylindrical drum. The annular plate is non-rotatably connected to the cylindrical drum and is axially movable relative to the face of the ring gear which faces the cylindrical drum. In this manner, the ring gear can be non-rotatably connected to the cylindrical drum and the axial piston engine is shifted to direct drive, i.e., the output shaft of the hydromechanical drive system has the same speed as the cylindrical drum of the axial piston engine.

The annular plate is shifted by a spring-loaded hydraulically releasable device to move it axially toward the face of the ring gear which faces the cylindrical drum. The shift to direct drive occurs as soon as the hydraulically releasable device is not under pressure.

According to an improvement of the invention, a second shiftable coupling has at least one annular plate located in an annular ring groove formed in the inner surfaces of the housing. The annular plate is non-rotatably connected to the housing and is axially movable relative to the face of the ring gear which faces the housing. When the first coupling is released and the second coupling is engaged, the ring gear is non-rotatably connected to the housing of the axial piston engine. The cylindrical drum is rotatable relative to the ring gear in this position but is non-rotatably connected to the sun gear and the drive system is in the reduction mode. It is advantageous if the annular plate of the second coupling can be acted upon by at least one spring-loaded hydraulically releasable device to move the plate toward the face of the ring gear which faces the housing.

According to another arrangement, the annular plates located adjacent to the faces of the ring gear can be in operative connection with a spring-loaded hydraulically releasable device located adjacent to the ring gear. The device is axially movable relative to the cylindrical drum or the housing. It is advantageous if the device in operative connection with the annular plates is located in a ring groove in the ring gear. The device has annular pistons with piston surfaces which can be acted upon by a hydraulic medium in the direction opposite the force of the spring, whereby each annular piston is individually activated.

In addition to the embodiment of the invention, in which a ring gear of a planetary transmission is axially located between the control surface on the housing and the face of the rotating cylindrical drum, it is possible, according to an embodiment of the invention, to attach the gear element to the component of the axial piston engine wherein the hydraulic-medium channels which open onto the control surface are formed. The gear element may be integral with the component. If the ring gear of a planetary transmission is provided as the gear element, it is non-rotatably connected to the housing. In this embodiment of the invention, at least one bearing is provided between the external surface of the cylindrical drum and the internal surface of the housing. The cylindrical drum is thereby directly supported in the housing of the axial piston engine rather than being supported on a shaft. In this arrangement, one bearing is located in the region of the swash plate and a second bearing is formed by the sun gear of the planetary transmission, which is non-rotatably connected to the cylindrical drum.

According to another embodiment of the invention, the output element of the hydromechanical drive system consists of a shaft passing through the cylindrical drum of the axial piston engine and the sun gear of the planetary transmission with non-positive and/or positive attachment devices on both ends. Thus, the shaft on the output side of the hydromechanical drive system runs through the axial piston engine.

This design can be used in a vehicle having at least two driven axles, wherein the hydromechanical drive system is located between the two axles and a drive shaft is connected to each axle. Each drive shaft is connected to one end of the shaft of the hydromechanical drive system. In prior art vehicles having a drive located between two driven axles, the hydromechanical drive system generally has an input shaft connected to the output shaft of the axial piston engine and another output shaft disposed parallel to it, and the input shaft and the output shaft are provided with shiftable spur gears. In contrast to such a design, the drive system according to the invention provides a significant reduction in space and in the number of component parts.

A complete understanding of the invention will be obtained from the following description when taken in connection with the accompanying drawings wherein like reference characters identify like parts throughout.

DESCRIPTION OF THE PREFERRED EMBODIMENTS

Figure 1:
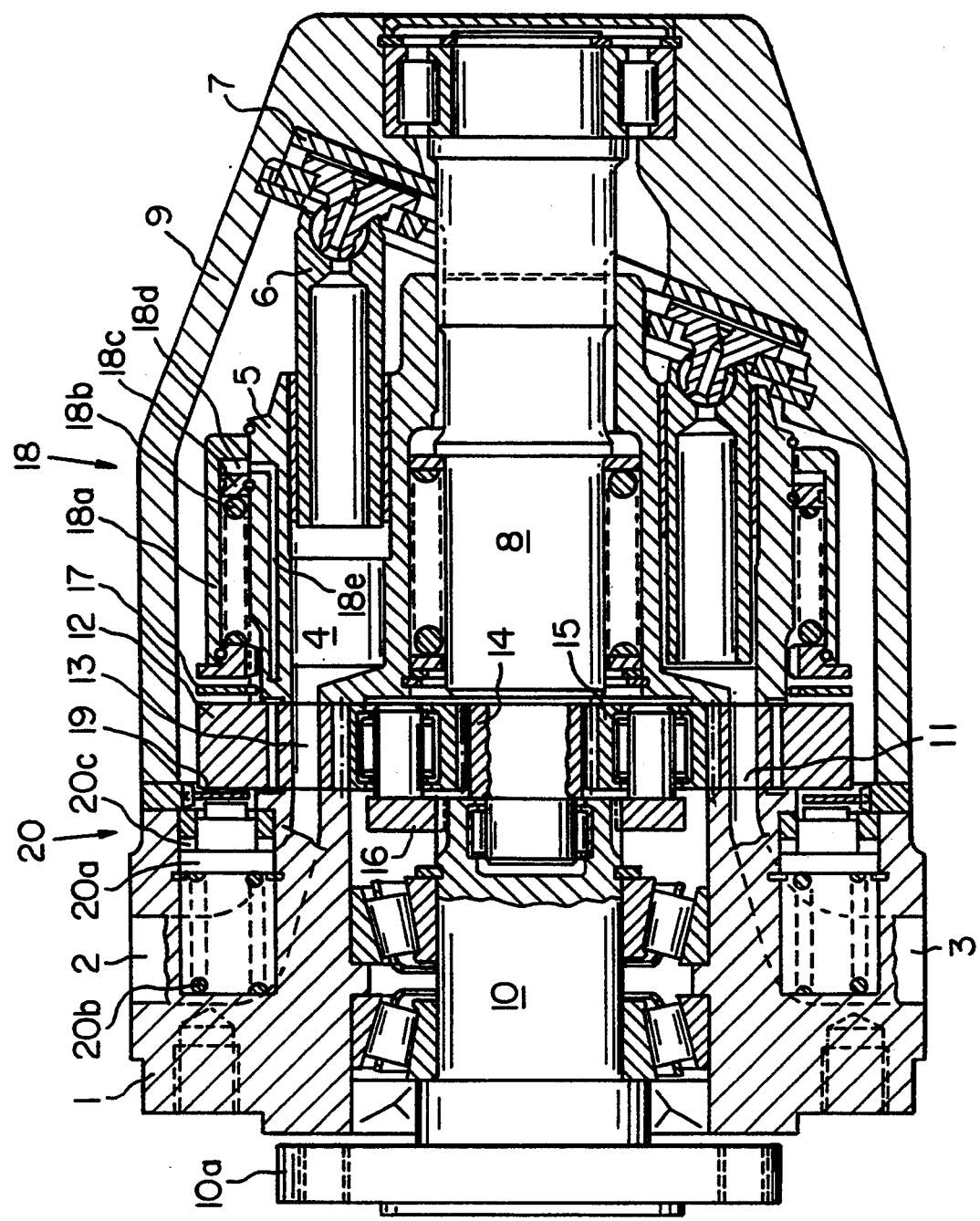
FIG. 1 is a longitudinal section through a hydromechanical drive system according to the invention.

The hydromechanical drive system shown in FIG. 1 of the drawings has hydraulic-medium channels 2 and 3 formed in a connection plate 1 to deliver and return a hydraulic medium to the working cylinders 4 of a cylindrical drum 5 of a swash-plate type axial piston engine.

Longitudinally movable pistons 6 are located in the working cylinders and are supported against a swash plate 7. The axial piston engine has a constant volumetric delivery because the angle between the rotational axis and swash plate 7 is constant. However, the invention is also applicable to axial piston engines having an adjustable swash-plate angle.

Cylindrical drum 5 is non-rotatably connected to a shaft 8 having one end mounted adjacent to swash plate 7 in a housing 9 which surrounds the cylindrical drum. The other end of shaft 8 is mounted in an axial gear shaft 10. Gear shaft 10 is mounted in bearings located in connection plate 1 and is provided on the outer end with a connection flange 10a.

Hydraulic-medium channels 2 and 3 open onto a control surface 11 formed on connection plate 1. It will be understood by those skilled in the art that control surface 11 can also be formed on a separate element such as a disc-shaped control base connected to connection plate 1. In this arrangement, the connection plate functions as a control base receptacle.

A ring gear 12 of a planetary transmission is located between control surface 11 and the opposing face of cylindrical drum 5. Ring gear 12 is provided with axially extending holes 13 which connect hydraulic-medium channels 2 and 3 in connection plate 1 with working cylinders 4 of cylindrical drum 5. The planetary transmission has a sun gear 14 which is fixed to shaft 8. The sun gear can also be formed integrally with shaft 8. The carrier 16 of planet gear 15 of the planetary transmission is fixed to gear shaft 10. The external diameter of ring gear 12 is slightly greater than the external diameter of cylindrical drum 5.

A non-rotatable axially movable annular plate 17 is provided on the outside surface of cylindrical drum 5 adjacent to ring gear 12. Annular plate 17 can be shifted in the axial direction by a spring-loaded hydraulically releasable device 18 which has an annular cylinder 18a which is moved toward the plate by a spring 18b which is supported against a stationary annular piston 18c. An annular space 18d is located between the face of annular piston 18c and annular cylinder 18a. Annular space 18d is connected to a hydraulic-medium channel 18e. When channel 18e and annular space 18d are filled with a hydraulic medium under pressure, annular cylinder 18a is moved away from plate 17 into the position shown in FIG. 1 of the drawings.

An annular plate 19 is located in an axial ring groove formed in connection plate 1 adjacent to the face of ring gear 12 which faces connection plate 1. Annular plate 19 can be shifted in the axial direction by a spring-loaded hydraulically releasable device 20 which consists of a plurality of pistons 20a located concentrically with the rotational axis of the ring gear in connection plate 1. Each piston 20a is in contact with a spring 20b to move it toward annular plate 19. Each piston 20a is movable away from annular plate 19 by filling an annular space 20c with a hydraulic medium under pressure.

Figure 2:
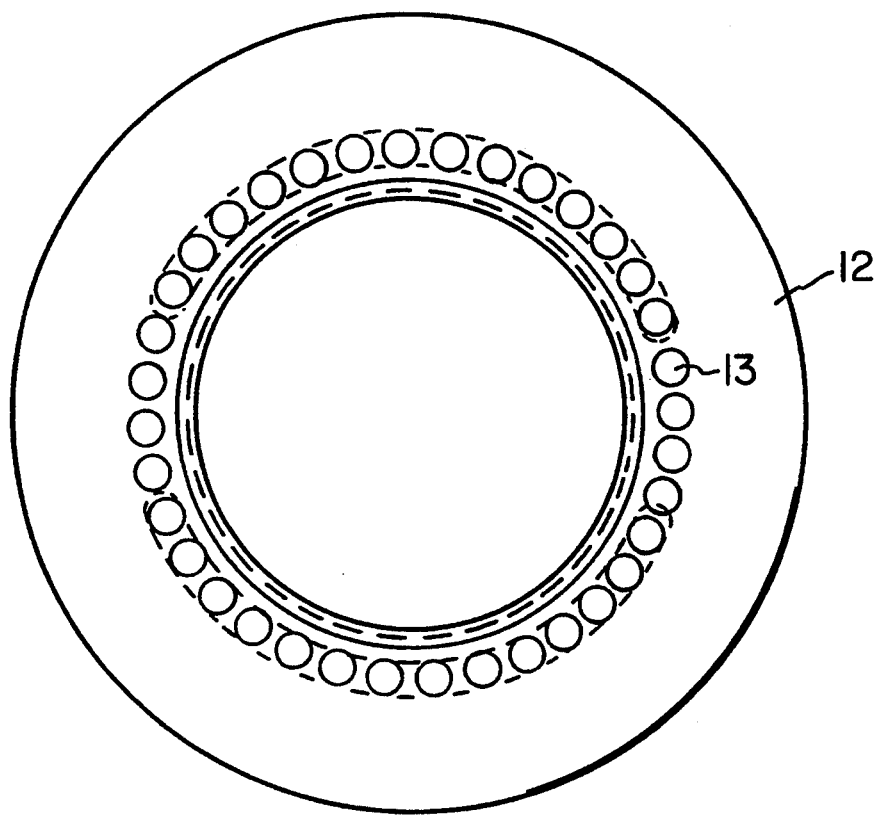
FIG. 2 is an end view of the ring gear of the planetary transmission shown in FIG. 1.

FIG. 2 of the drawings shows ring gear 12 of the planetary transmission with axially directed holes 13 therethrough. The holes may be arranged in a staggered pattern, if desired. Kidney-shaped control openings are formed in connection plate i at the end of each hydraulic-medium channel 2 and 3 and are represented by broken lines in FIG. 2 of the drawings.

The hydromechanical drive system shown in FIGS. 1 and 2 of the drawings functions by passing a hydraulic medium through one of hydraulic-medium channels 2 or 3, through the kidney-shaped control openings and through holes 13 into working cylinders 4 of cylindrical drum 5 to force working piston 6 against swash plate 7, to rotate cylindrical drum 5 and shaft 8. When devices 18 and 20 are acted on by a pressurized hydraulic medium, annular plates 17 and 19 are moved out of contact with the faces of ring gear 12 as shown in FIG. 1 of the drawings and ring gear 12 is freely rotatable to place the hydromechanical drive system in the free-wheeling mode wherein no torque is applied to gear shaft 10.

The annular plates are closed against the faces of the ring gear by springs when the hydraulic medium under pressure is removed from annular spaces 18d and 20c, respectively, of devices 18 and 20. In this case, the ring gear is non-rotatably connected with both connection plate 1 and cylindrical drum 5 and the hydromechanical drive system is in the braking mode and the planetary transmission acts as a locking mechanism.

When ring gear 12 is non-rotatably connected only to cylindrical drum 5, the cylindrical drum, ring gear 12, and sun gear 14 rotate at the same speed. The planet gears 15 do not rotate around their own rotational axes but rather rotate with carrier 16 at the same speed as the aforementioned elements and the hydromechanical drive system is in the direct drive mode.

When ring gear 12 is non-rotatably connected only to connection plate 1, it corresponds to a stationary ring gear fixed to the housing. Thus, the speed of sun gear 14 is reduced. The carrier 16 and gear shaft 10 rotate at a slower speed than sun gear 14.

Figure 3:
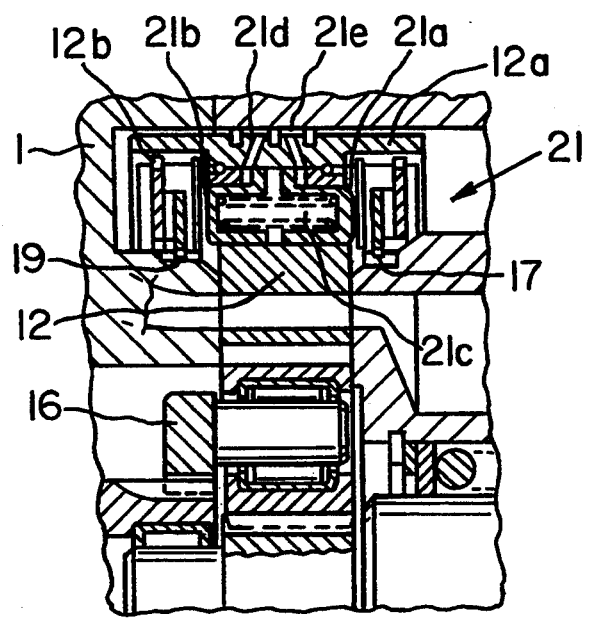
FIG. 3 is a partial longitudinal section through the ring gear of a planetary transmission having an integrated shift.

FIG. 3 of the drawings shows a modified design wherein a device 21 is located inside of ring gear 12 in place of devices 18 and 20. The device 21 actively engages with annular plates 17 and 19 and consists of a spring-loaded axially movable annular piston 21a or 21b in an axial ring groove formed in ring gear 12. The ring grooves are connected to each other by a plurality of axial holes located around the perimeter of ring gear 12. A spring 21c is disposed in each axial hole to force annular pistons 21a and 21b apart. A hydraulic medium under pressure is delivered to the piston surfaces through a hole in ring gear 12 which opens on the external perimeter of the ring gear in an annular chamber 21d or 21e to move annular pistons 21a and/or 21b. The annular chambers 21d and 21e are formed by three spaced sealing rings located on the external perimeter of ring gear 12 and each annular chamber is connected to a hydraulic-medium source. The annular chambers may be acted on by the hydraulic medium either jointly or separately. Thus, the annular pistons 21a and 21b can be moved axially inwardly together or separately against the force of springs 21c by the hydraulic medium under pressure acting on the piston surfaces.

Instead of annular pistons located in ring grooves, it is also possible to provide a plurality of axial holes on the perimeter of the ring gear in each of which two cylindrical pistons are located in opposition to each other and between which a spring is located. However, in this arrangement the delivery of hydraulic medium to the piston surfaces becomes more complicated.

The ring gear 12 shown in FIG. 3 of the drawings has extensions 12a and 12b extending axially from its opposite faces which are provided on the inner surfaces with axially extending splines which non-twistably receive one or more axially movable annular coupling plates. In each case annular stop discs are provided on the axial outer end. The coupling plates prevent rotation of annular pistons 21a and 21b in the ring grooves. However, if annular pistons 21a and 21b are located in the ring grooves with torsional protection, the coupling plates are not required. This is particularly true if annular pistons 21a and 21b are provided with friction surfaces on the external faces.

Figure 4:
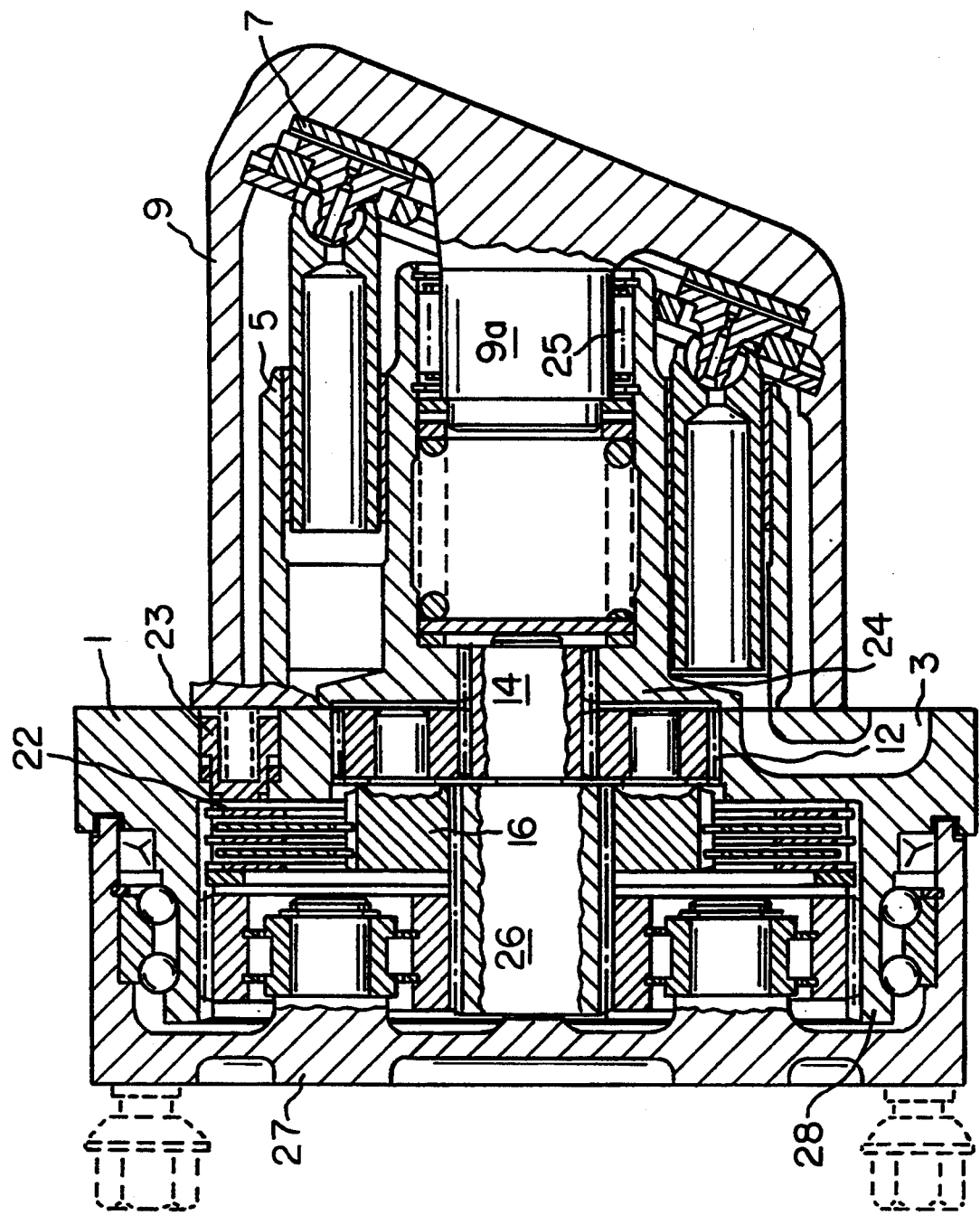
FIG. 4 is a longitudinal section through a second embodiment of the invention.

The embodiment of the hydromechanical drive system shown in FIG. 4 of the drawings has a hub output rather than a shaft output. In this embodiment, connection plate 1 forms the ring gear and closes the housing of the axial piston engine and hydraulic-medium connection. The connection plate functions as the hub carrier and as the housing for a two-stage planetary transmission. The ring gear 12 is located on the connection plate in the region of hydraulic-medium channels 2 and 3 and serves as the ring gear of the first stage of the planetary transmission. In other words, the control base receptacle of the axial piston engine is designed as the ring gear of the planetary transmission. The planetary transmission is brakable but not shiftable. Radial brake plates 22 are alternately non-rotatably connected to carrier 16 of the first stage of the planetary transmission or to connection plate 1. A plurality of hydraulically actuatable axial brake pistons 23 are located in connection plate 1. The brake pistons operate against a spring force and only one brake piston is shown in FIG. 4 of the drawings.

The axial piston engine shown in FIG. 4 of the drawings has no output shaft. The cylindrical drum 5 is connected by internal splines with sun gear 14 of the first stage of the planetary transmission. Sun gear 14 is designed as a splined shaft and simultaneously serves as a support for one end of cylindrical drum 5. A journal 9a is formed on housing 9 adjacent to swash plate 7 of the axial piston engine. The journal protrudes into a central hole in cylindrical drum 5 and is provided with a roller bearing 25, which supports the end of the cylindrical drum.

The torque output of the first stage of the planetary transmission is created by carrier 16 which is non-rotatably connected to a sun gear 26 of the second stage of the planetary transmission. Sun gear 26 is designed as a splined shaft. The carrier of the second stage is formed by a hub 27. The ring gear 28 of the second stage is formed on the connection plate 1 and functions as a hub carrier.

Figure 5:
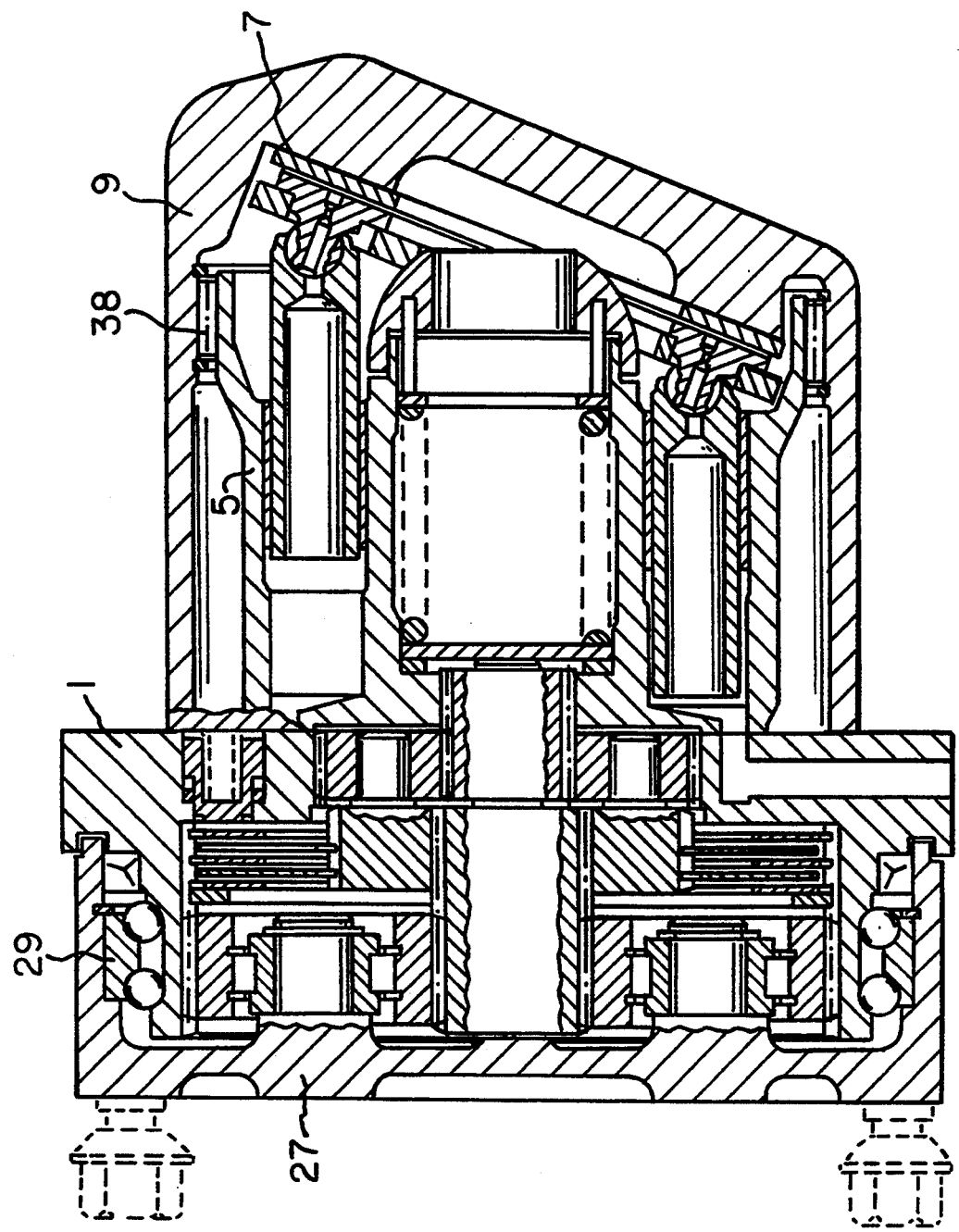
FIG. 5 is a longitudinal section through a third embodiment of the invention.

The embodiment of the invention shown in FIG. 5 of the drawings differs from the embodiment shown in FIG. 4 in that instead of supporting cylindrical drum 5 on journal 9a, a bearing 38 is located on the outer surface at the end of the cylindrical drum adjacent to swash plate 7. Thus, the axial piston engine has no shaft of its own for support and for output. This design includes a roller bearing 29 between hub 27 and connection plate 1 and a roller bearing 38 between cylindrical drum 5 and housing 9.

Figure 6:
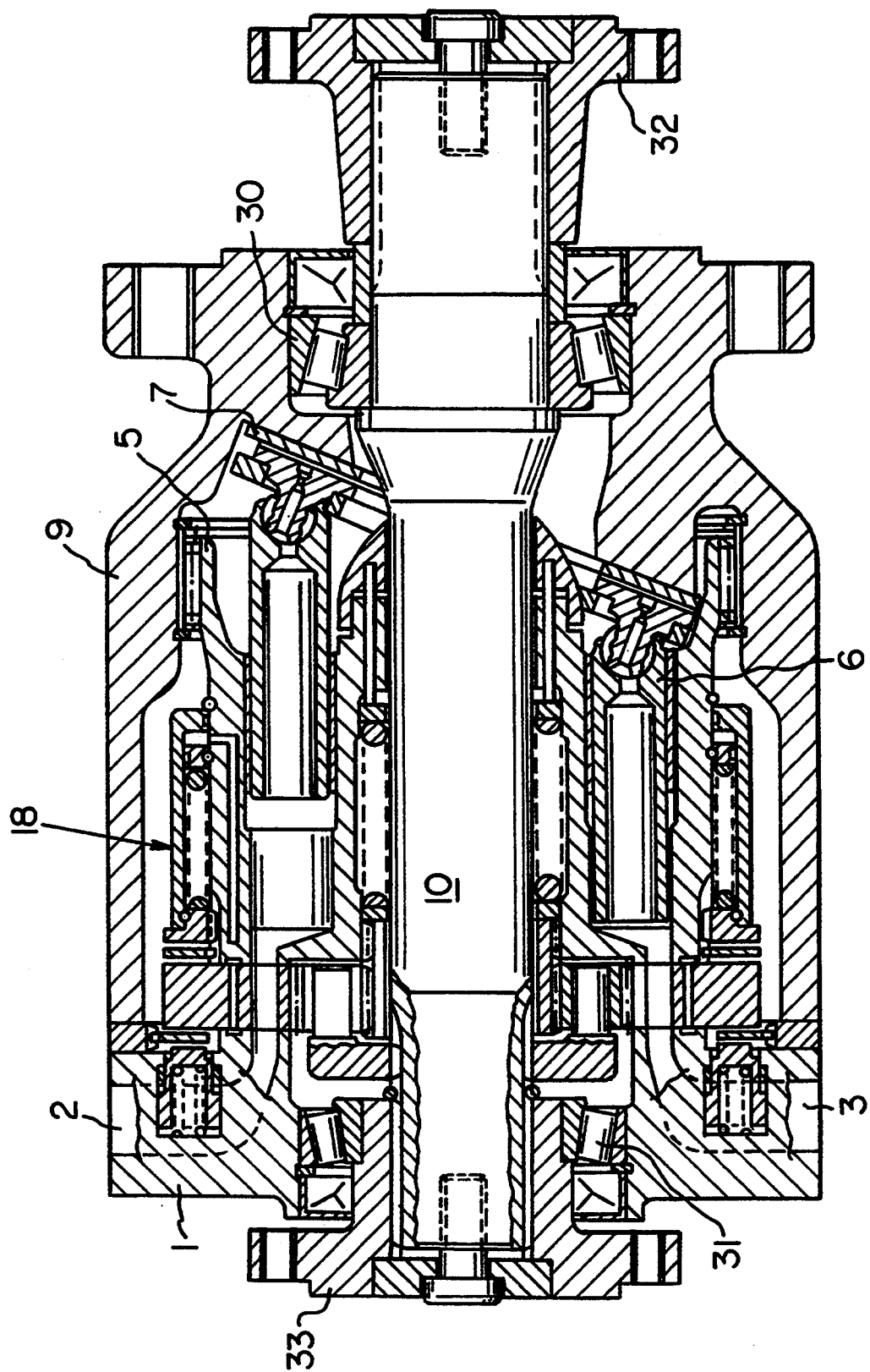
FIG. 6 is a longitudinal section through a fourth embodiment of the invention.

FIG. 6 shows a further embodiment of the invention which is structurally oriented in the same way as FIG. 1 of the drawings, but as shown in FIG. 5 of the drawings, is designed as a single-stage planetary transmission. The axial piston engine has no shaft of its own for support of cylindrical drum 5 and for output. The space saved in this arrangement permits the use of a gear shaft 10 which extends through the axial piston engine which provides two substantial advantages. First, output is available on both ends of the hydromechanical drive system; and second, the distance between bearings 30 and 31 for the gear shaft is significantly increased. Such a drive system is especially useful in a vehicle equipped with two driven axles. Attachment elements 32 and 33 are attached at opposite ends of gear shaft 10.

While specific embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which are to be given the full breadth of the appended claims and any and all equivalents thereof.

I claim:

1. A hydromechanical drive system having a swashplate type hydrostatic axial piston engine and a mechanical transmission, said axial piston engine including an outer housing having an interior cylindrical surface, a rotary cylindrical drum having an exterior surface spaced from said interior surface of said outer housing and working cylinders located in said cylindrical drum, a reciprocating working piston located in each of said working cylinders, a connection plate fixed to said outer housing and having a control surface formed thereon in flow connection with said working cylinders, hydraulic-medium channels formed in said connection plate opening on said control surface, whereby said working cylinders are periodically connected with said hydraulic-medium channels during rotation of said cylindrical drum to reciprocate said working pistons, and a gear element located adjacent to said control surface on said connection plate.

2. A hydromechanical drive system as set forth in claim 1, wherein said gear element is integral with said connection plate.

3. A hydromechanical drive system as set forth in claim 1, wherein said mechanical transmission is a planetary transmission having at least one stage and said gear element is a ring gear of said planetary transmission, said planetary transmission includes a sun gear, a rotatable output shaft and a carrier connected to said rotatable output shaft, and means for non-rotatably connecting said cylindrical drum to said sun gear.

4. A hydromechanical drive system as set forth in claim 3, wherein said ring gear is located axially between said control surface on said connection plate and the end of said cylindrical drum facing said control surface and a plurality of spaced axial holes formed in said ring gear for connecting said hydraulic-medium channels opening on said control surface with said working cylinders in said cylindrical drum.

5. A hydromechanical drive system as set forth in claim 3, wherein the axis of rotation of said ring gear is coaxial with the axis of rotation of said cylindrical drum, and including axially moveable coupling means for connecting said ring gear with said cylindrical drum and with said outer housing.

6. A hydromechanical drive system as set forth in claim 5, wherein said axially moveable coupling means includes a first shiftable coupling having at least one annular plate located around the outer surface of said cylindrical drum, and means for non-rotatably connecting said at least one annular plate to said cylinder drum permitting axial movement along said cylindrical drum relative to the face of said ring gear facing the end of said cylindrical drum.

7. A hydromechanical drive system as set forth in claim 6, including a spring-loaded hydraulically releasable means for axially moving said annular plate along said cylindrical drum relative to the face of said ring gear facing the end of said cylindrical drum.

8. A hydromechanical drive system as set forth in claim 6, wherein said axially moveable coupling means includes a second shiftable coupling having at least one annular plate, an axial ring groove formed in the inner surface of said housing, and means for non-rotatably connecting said at least one annular plate in said ring groove for axial movement of said at least one annular plate relative to the face of said ring gear facing said housing along said outer housing.

9. A hydromechanical drive system as set forth in claim 7, wherein said axially moveable coupling means includes a second shiftable coupling having at least one annular plate, an axial ring groove formed in the inner surface of said housing, and means for non-rotatably connecting said at least one annular plate in said ring groove for axial movement of said at least one annular plate relative to the face of said ring gear facing said housing along said outer housing.

10. A hydromechanical drive system as set forth in claim 8, including at least one spring-loaded hydraulically releasable means for moving said annular plate in said ring groove relative to the face of said ring gear facing away from said cylindrical drum.

11. A hydromechanical drive system as set forth in claim 5, including annular plates located on opposite sides of said ring gear and a spring-loaded hydraulically releasable means located inside said ring gear for axially moving said annular plates relative to said ring gear.

12. A hydromechanical drive system as set forth in claim 11, including an axial ring groove formed in said ring gear, annular pistons located in said ring groove, a spring located between and in contact with each of said annular pistons, each of said annular pistons having a piston surface for contact with a hydraulic medium under pressure and means for selectively supplying a hydraulic medium under pressure to said surface of each of said annular pistons for axially moving said annular pistons against the force of said spring, for individually actuating each of said annular pistons.

13. A hydromechanical drive system as set forth in claim 1, including at least one bearing located between the exterior surface of said cylindrical drum and the interior surface of said outer housing.

14. A hydromechanical drive system as set forth in claim 3, including at least one bearing located between the exterior surface of said cylindrical drum and the interior surface of said outer housing.

15. A hydromechanical drive system as set forth in claim 14, wherein said at least one bearing is located on said cylindrical drum adjacent to said swash plate and an additional bearing for said cylindrical drum formed by said sun gear of said planetary transmission.

16. A hydromechanical drive system as set forth in claim 14, wherein said gear element is a gear shaft extending through said cylindrical drum of said axial piston engine and said sun gear of said planetary transmission and attachment means on at least one end of said gear shaft.

* * * * *